US005522060A

United States Patent [19]
Kawase et al.

[11] Patent Number: 5,522,060
[45] Date of Patent: May 28, 1996

[54] MULTIPROCESSOR MEMORY MANAGING SYSTEM AND METHOD FOR EXECUTING SEQUENTIALLY RENEWED INSTRUCTIONS BY LOCKING AND ALTERNATELY READING SLAVE MEMORIES

[75] Inventors: Kei Kawase, Komae; Takashi Matsumoto, Chiba; Takao Moriyama, Yokohama, all of Japan

[73] Assignee: International Business Machines Corporation, Armonk, N.Y.

[21] Appl. No.: 331,291

[22] Filed: Oct. 28, 1994

Related U.S. Application Data

[63] Continuation of Ser. No. 933,457, Aug. 21, 1992, abandoned.

[30] Foreign Application Priority Data

Aug. 22, 1991 [JP] Japan ................................. 3-233749

[51] Int. Cl.⁶ ............................ G06F 13/00; G06F 13/14
[52] U.S. Cl. ........................ 395/479; 395/476; 395/484; 395/490; 395/726; 395/290; 395/200.5; 364/DIG. 1
[58] Field of Search ................................. 395/425, 444, 395/475, 476, 479, 484, 490, 164, 165, 166, 200.05, 288, 290, 726; 364/DIG. 1; 345/200

[56] References Cited

U.S. PATENT DOCUMENTS

| | | | |
|---|---|---|---|
| 5,179,665 | 1/1993 | Roslund et al. | 395/250 |
| 5,182,797 | 1/1993 | Liang et al. | 395/164 |
| 5,249,265 | 9/1993 | Liang | 395/164 |

*Primary Examiner*—Glenn Gossage
*Attorney, Agent, or Firm*—Mark E. McBurney; Diana L. Roberts

[57] ABSTRACT

A multiprocessor memory managing system and method make it possible for a series of instructions corresponding to a data set, which is sequentially renewed by a series of data, to be sequentially executed by a multiprocessor with small overhead. More specifically, the system and method provide a procedure dealing with a data set which is sequentially renewed by a series of data having a sequence, in which snap shots of the data set at arbitrary points of time are assigned to element processors of a multiprocessor at a high speed to execute instructions corresponding to the snap shots in an efficient and parallel fashion. The apparatus includes a master memory and first and second slave memories for storing renewable data. The first and second slave memories are alternately locked and read for snapshots of the renewable data.

5 Claims, 11 Drawing Sheets

DISPLAY LIST

| | |
|---|---|
| GPICD | Set Interior Color Direct |
| CYAN | |
| GPSPR | Set Surface Properties |
| deff. coeff. = 0.9 | |
| GPPG3 | Polygon 3 |
| V1<br>V2<br>V3 | |
| GPICD | Set Interior Color Direct |
| PINK | |
| GPTS3 | Triangle Strip 3 |
| V1<br>V2<br>V3<br>V4 | |
| ⋮ | |

MULTIPROCESSOR MEMORY MANAGING SYSTEM AND METHOD FOR EXECUTING SEQUENTIALLY RENEWED INSTRUCTIONS BY LOCKING AND ALTERNATELY READING SLAVE MEMORIES

This is a continuation of application Ser. No. 07/933,457 filed Aug. 21, 1992, now abandoned.

BACKGROUND OF THE INVENTION

1. Field of the Invention

This invention relates to a multiprocessor and its control mechanism in which a data set is sequentially renewed by a series of data having snap shots (instantaneous values) of the data set at arbitrary points of time are assigned at a high speed to element processors of the multiprocessor, so that instructions for the snap shots such as drawing instruction primitives are efficiently executed in parallel.

2. Description of Related Art

PHIGS (Programmer's Hierarchical Interactive Graphics System), which is one of existing three-dimensional graphics interfaces, holds data in the form of a structure, estimates the data structure upon drawing, and generates a series of drawing instructions. The series of drawing instructions includes attribute setting instructions and drawing instructions (primitives). The attribute setting instructions enter their attribute values in corresponding items in TSL (Traversal State List). The primitives perform drawing by using attribute values held in TSL when the primitives are issued. When parallel execution of this by the multiprocessor is desired, it is efficient to assign processors to respective primitives and have them execute the primitives. In this case, each processor to which the primitives are assigned must remember the contents of TSL at the time of assignment of the primitive. To this end, each processor must copy TSL in its own region before processing the primitives. The size of TSL is normally more than 1000 bytes. Therefore, overhead increases because of an increase in the traffic of the bus and so on, and the advantage of the high speed nature by parallel execution of the multiprocessor is decreased.

Japanese Patent Publication 4-213736 discloses a technique for logging changes in a memory of an active processor of a fault tolerant computer occurring on and after a check point and for modifying memory of a backup processor upon the start-up thereof. This application, however, does not teach the use of multiple memories in a single processor to hold both a data set during execution and a current data set.

SUMMARY OF THE INVENTION

An object of the invention is to execute a series of instructions that correspond to a data set, which is sequentially renewed by a series of renewal data.

More specifically, the object of the invention is to provide a procedure dealing with a data set which is sequentially renewed by a series of data having a sequence, in which snap shots of the data set at arbitrary points of time are assigned to element processors of a multiprocessor at a high speed to execute instructions corresponding to the snap shots in an efficient and parallel fashion.

BRIEF DESCRIPTION OF THE DRAWINGS

FIG. 3 is a series of instructions to be executed by the processor elements of the present invention;

DETAILED DESCRIPTION OF THE PREFERRED EMBODIMENTS

In order to attain the object, the invention proposes to use a plurality of memories, such as triple memories, which are provided in the interior of each element processor and can be selectively locked so that snap shots of a data set at arbitrary points of time can be obtained at a high speed. That is, one of the triple memories (called a master copy) is used to always maintain up-dated contents, and one of the other two memories (called slave copies) is locked at an arbitrary point of time to obtain snap shots. The currently unlocked slave copy is controlled to have the same contents as those of the master copy. When another need for snap shots occurs, the slave copy previously unlocked is then locked and used, while the slave copy that was locked heretofore is then unlocked and controlled to have the same contents as those of the master copy. In this manner, snap shots at arbitrary points of time can be obtained at a high speed. Therefore, overhead for executing parallel processes is small, and the advantage of parallel processing is maintained maximal.

The invention was explained above using triple memories for simplicity. However, double memories may be used with only one slave copy. In this case, the efficiency is slightly decreased because instructions cannot be assigned during the process that makes the slave copy and the master copy contents the same. The memories may also be quadruple (four) or more.

An embodiment of the invention is explained below with reference to the drawings. The embodiment is described as processing PHIGS in parallel.

Figure 1:
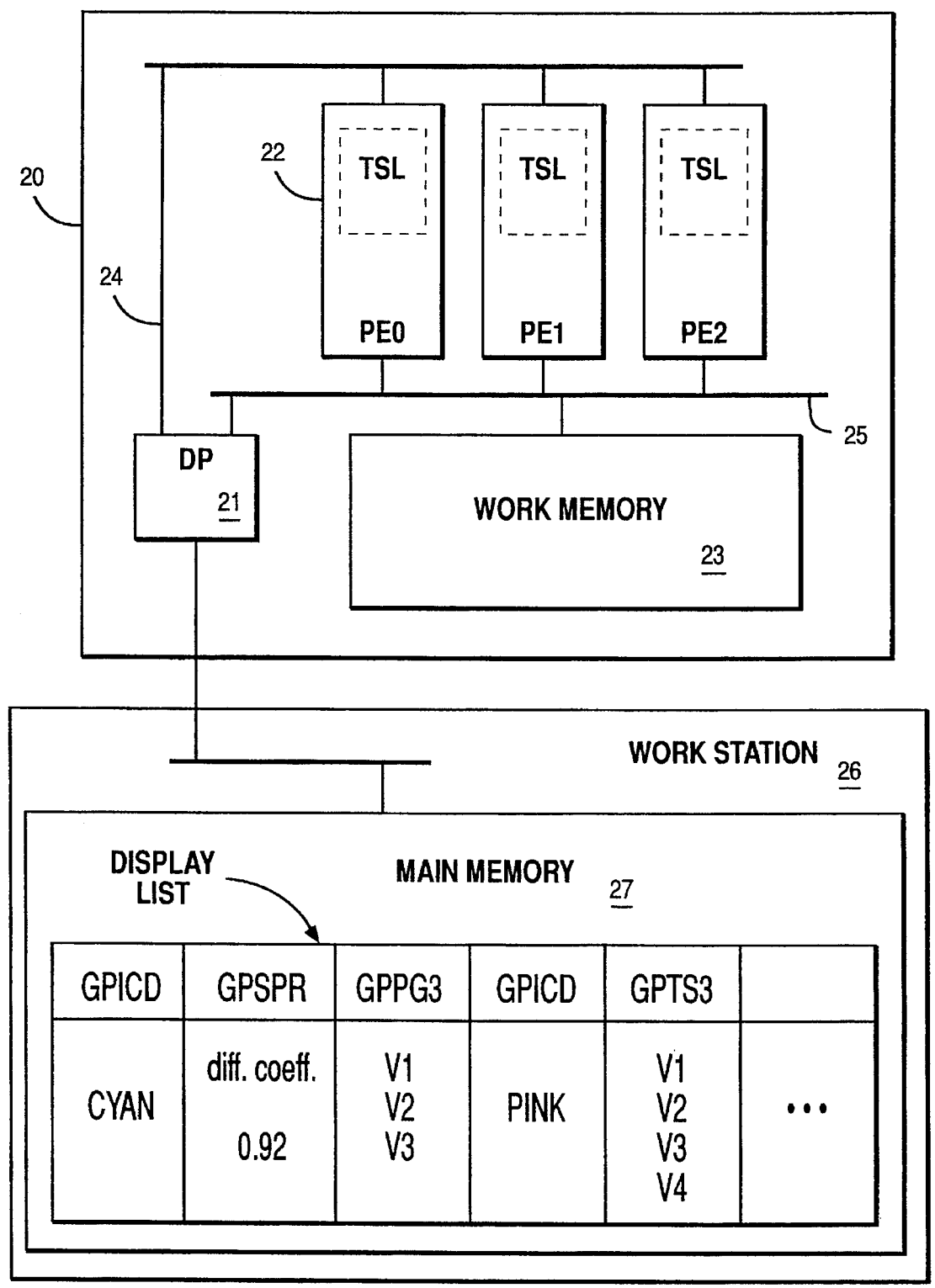
FIG. 1 is a block diagram showing the entire construction of an embodiment of the invention.

FIG. 1 shows the entirety of the system. In FIG. 1, a graphics system (Geometry Engine) 20 is in the form of a multiprocessor to which the invention is applied. This is packaged on a single card. The graphics system 20 includes a dispatch processor 21, a plurality of element processors 22, a shared work memory 23, an attribute bus, and a data bus 25. The attribute bus 24 connects the dispatch processor 21 and element processors 22, and broadcasts attribute instructions or the like from the dispatch processor 21 to the element processors, respectively. The data bus 25 connects the dispatch processor 21, the element processors 22, and the shared work memory 23, with each other, and communicates primitives of PHIGS.

The graphics system 20 is to be packaged on a Microchannel bus of a host work station 26 which may be, for example, a Power Station/6000 fabricated by International Business Machines Corporation (Armonk, N.Y.). The graphics system 20 performs graphics processing on the basis of a display list (a series of instructions consisting of attribute setting instructions and primitives) of PHIGS on a main memory 27 of the work station 26. Results of the graphics process are displayed on a display unit (not shown) of the work station 26.

The dispatch processor 21 reads the display list on the main memory 27 of the work station 26, and sequentially extracts attribute setting instructions and primitives. When the instructions are attribute setting instructions, the dispatch processor 21 permits addresses and attribute values corresponding to the attribute items to flow to the attribute bus 24. It also writes the primitives on the element processors 22 (PE0, PE1, and PE2) through the data bus 25. In response to the write of the primitives on the work memory 23, the dispatch processor 21 supplies lock instructions through the attribute bus 24 to a TSL buffer 28 (described later with reference to FIG. 2) of one of the element processors 22 to which the primitives are to be assigned, and subsequently supplies executive instructions (GO) through the data bus 25 to an executive unit 29 (FIG. 2) of the element processor 22.

FIG. 1 shows the multiprocessor as having only three element processors 22. However, the number of element processors is not limited to three.

Figure 2:
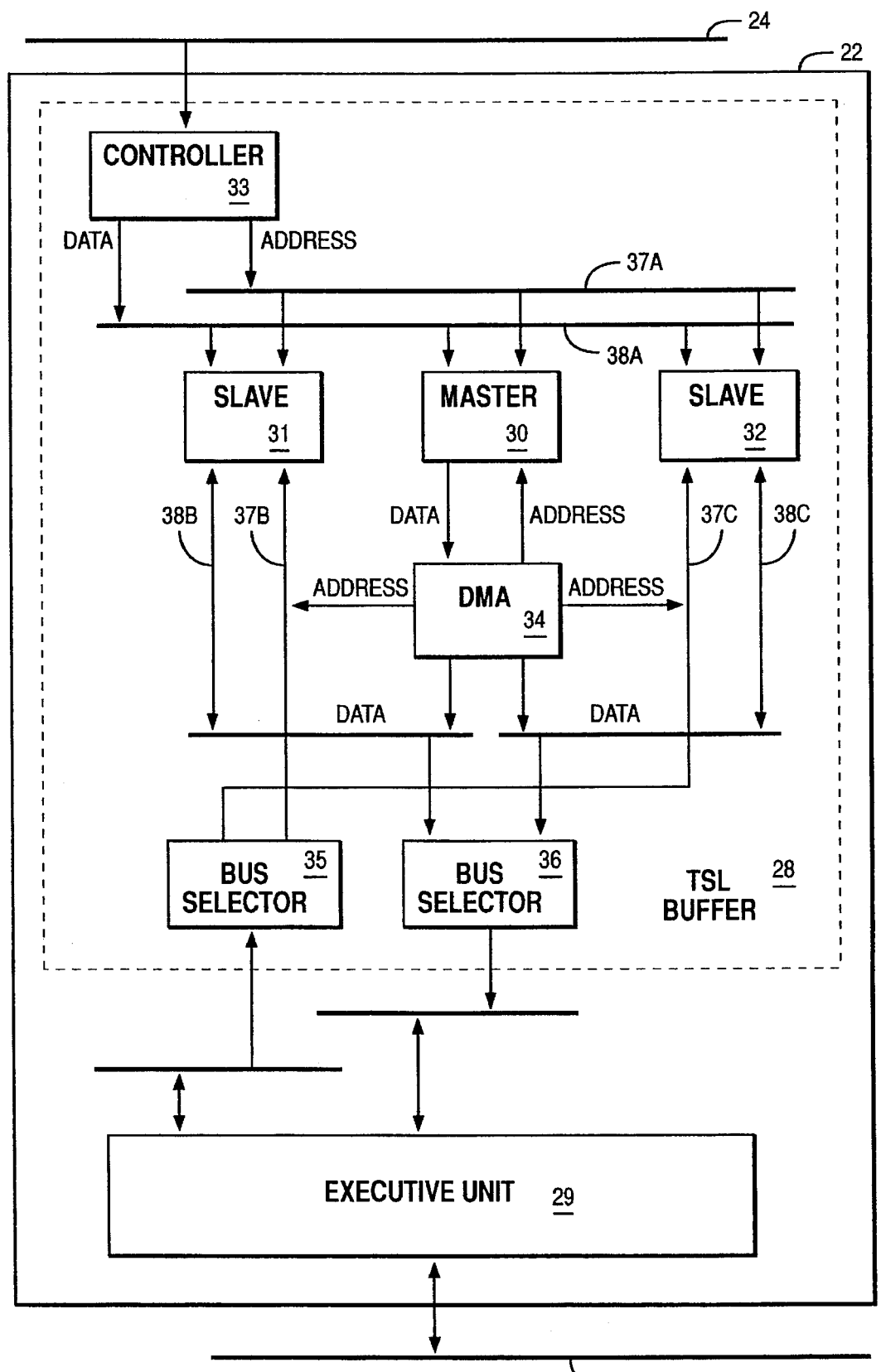
FIG. 2 is a block diagram showing a part of the same embodiment in greater detail.

FIG. 2 shows the detail of one element processor 22. In FIG. 2, the element processor 22 includes an executive unit (interior CPU core) 29 and a TSL buffer 28. The executive unit 29 performs process of primitives.

The TSL buffer 28 includes a dual port master memory 30, dual port slave memories 31 and 32, controller 33, DMA (Direct Memory Access Controller) 34, bus selectors 35 and 36, and address and data buses 37A, 37B, 37C, 38A, 38B, 38C. The controller 33 is connected to the attribute bus 24 and to one of the ports of the master memory 30 and the slave memories 31 and 32 through first buffer address bus 37A and a first buffer data bus 38A. The other port of the slave memory 31 is connected to second buffer address bus 37B and a second buffer data bus 38B. Similarly, the other port of the slave memory 32 is connected to third buffer address bus 37B and second buffer data bus 38B. The other port of the master memory 30 is connected via DMA 34 to the second and third buffer address buses 37B, 37C, and the second and third buffer data buses 38B, 38C. The bus selectors 35 and 36 select one of the pair including the second buffer data bus 38B and the second buffer address bus 37B and the pair including of the third buffer data bus 38C and the third buffer data bus 37C, and connect it to an interior data bus 39 and an interior address bus 40 of the element processor 22.

The controller 33 alternately locks the slave memories 31 and 32 in response to lock instructions sent from the dispatch processor 21.

Assume here that a series of instructions shown in FIG. 3 is entered. The series of instructions is first delivered to the dispatch processor 21. If the delivered instructions are attribute setting instructions, the dispatch processor 21 permits them to flow to the attribute bus 24.

Figure 4:
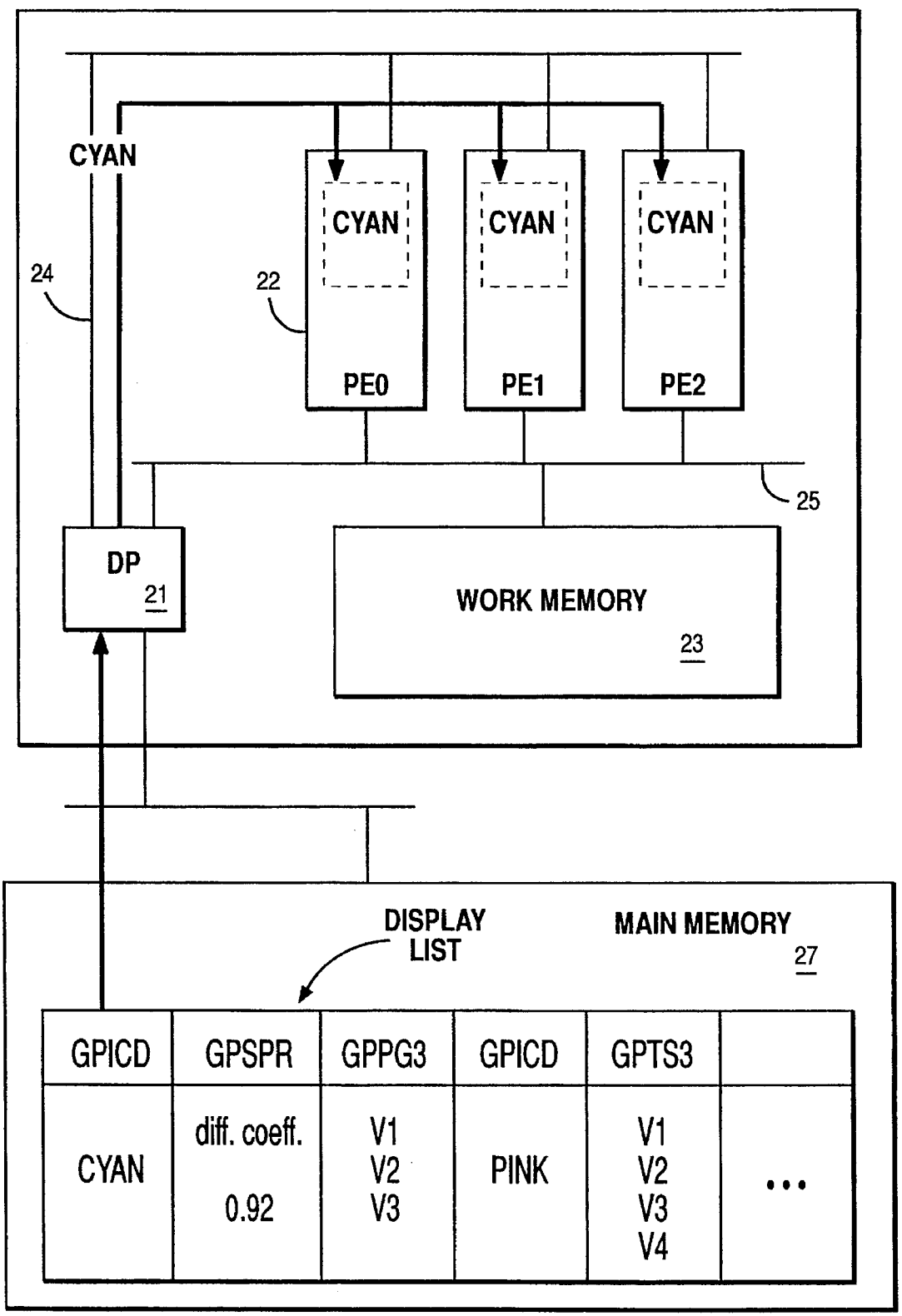
FIG. 4 is a block diagram showing the elements of the system of the present invention and the status of an attribute setting stored in main memory.

FIG. 4 shows the status in which first attribute setting instructions (Set Interior Color Direct CYAN) have been delivered to the element ports of each of the master memory 30 and the slave memories 31 and 32 through first buffer address bus 37A and first buffer data bus 38A. The other port of the slave memory 31 is connected to a second buffer address bus 37B and a second buffer data bus 38B. Similarly, the other port of the slave memory 32 is connected to a third buffer address bus 37B and a second buffer data bus 38B. The other port of the master memory 30 is connected via DMA 34 to the second and third buffer address buses 37B, 37C, and the second and third buffer data buses 38B, 38C. The bus selectors 35 and 36 select one of the pair consisting of the second buffer data bus 38B and the second buffer address bus 37B and the pair consisting of the third buffer data bus 38C and the third buffer data bus 37C, and connect it to an interior data bus 39 and an interior address bus 40 of the element processor 22.

The controller 33 alternately locks the slave memories 31 and 32 in response to lock instructions sent from the dispatch processor 21.

Assume here that a series of instructions shown in FIG. 3 is entered. The series of instructions is first delivered to the dispatch processor 21. If the delivered instructions are attribute setting instructions, the dispatch processor 21 permits them to flow to the attribute bus 24.

FIG. 4 shows the status in which first attribute setting instructions (Set Interior Color Direct CYAN) have been delivered. Each element processor 22 (PE0, PE1, and PE2) copy the attribute values into its own TSL buffer 28.

Figure 5:
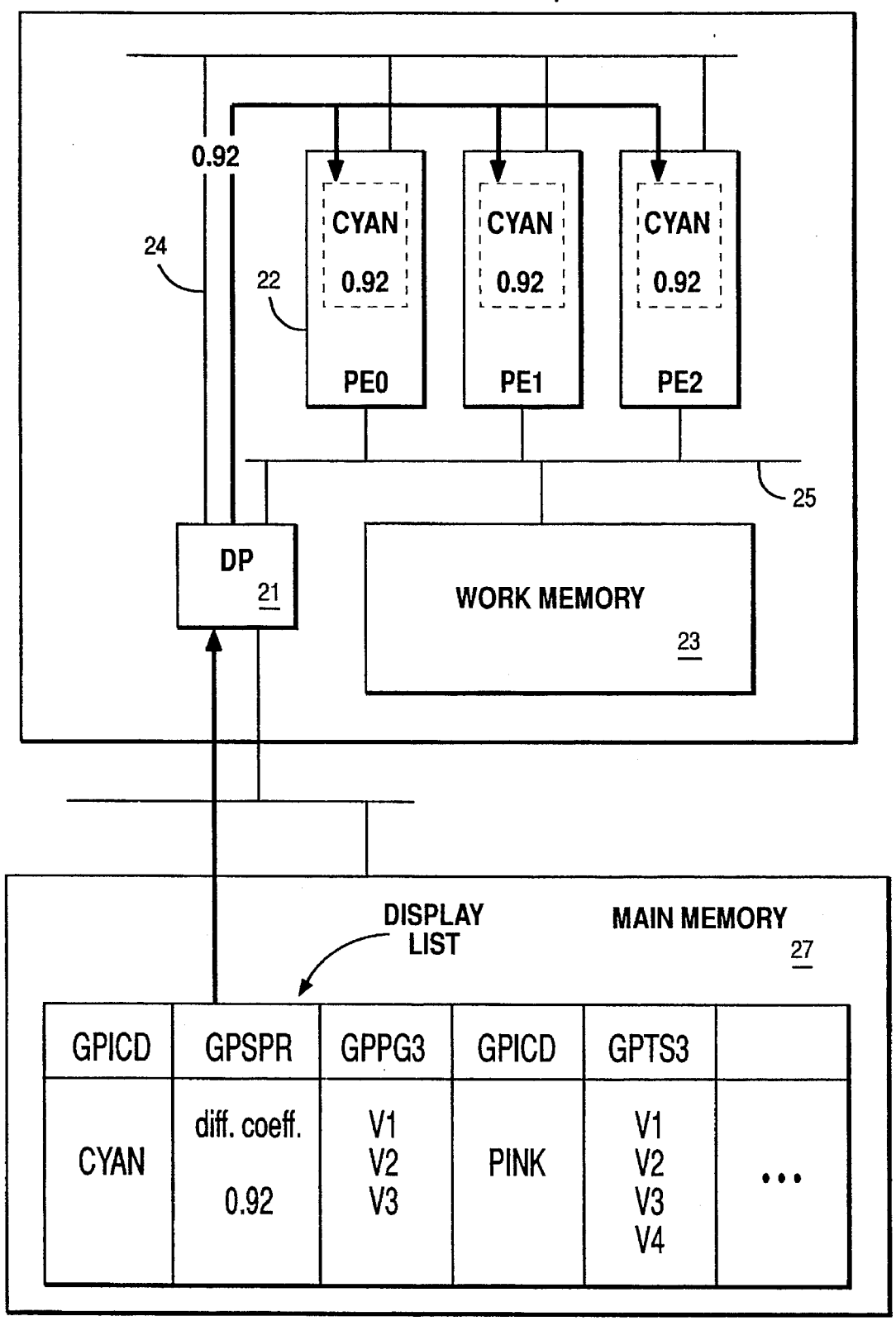
FIG. 5 is a block diagram showing the elements of the present invention and the next set of attribute settings stored in main memory.

FIG. 5 shows the status in which next attribute setting instructions (Set Surface Properties diff. coeff.=0.9) have been delivered. Each element processor 22 (PE0, PE1, and PE2) copy attributes into its own TSL buffer 28 in the same manner.

Figure 6:
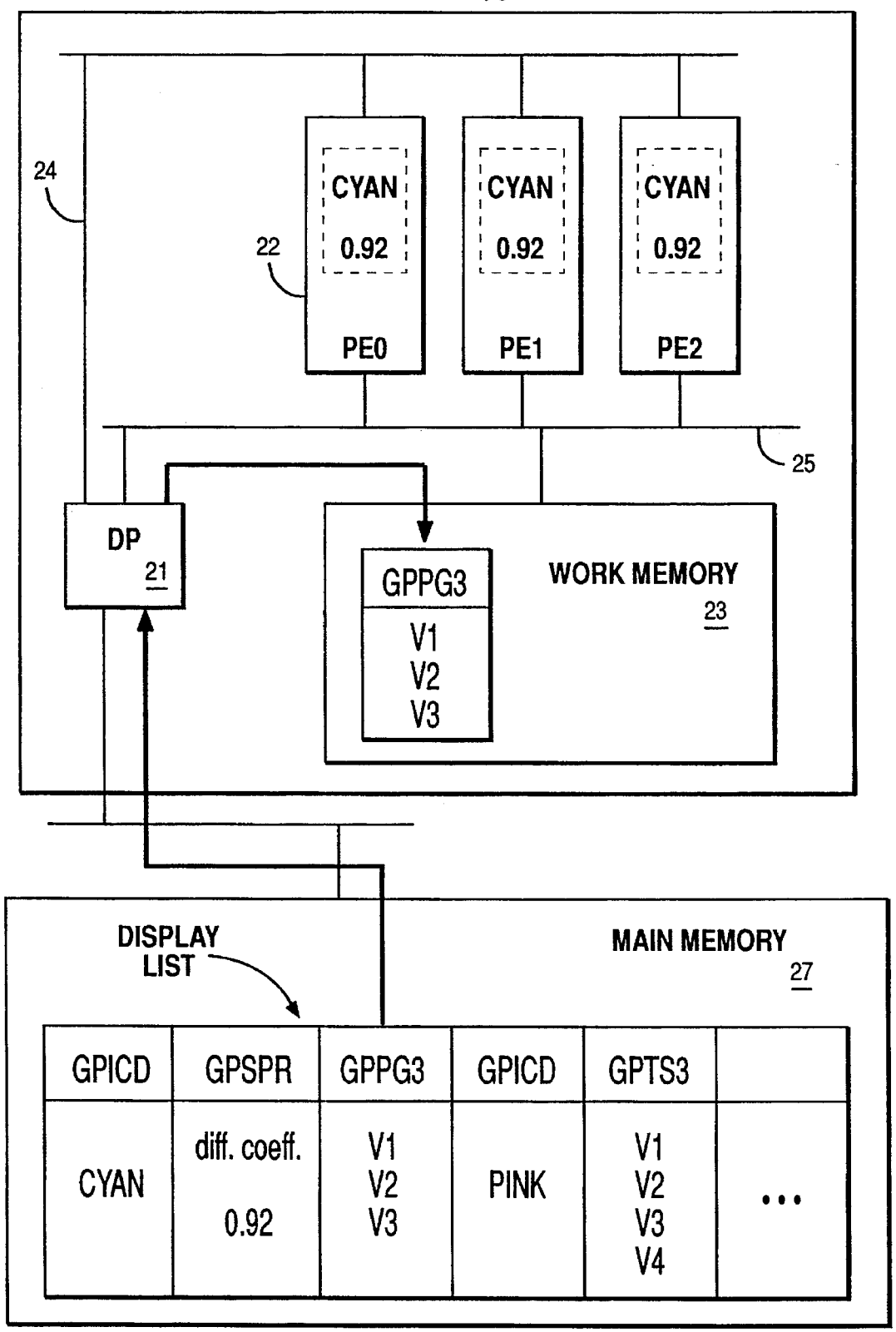
FIG. 6 is the block diagram of FIGS. 4 and 5 also illustrating the next set of primitives stored in working memory.
Figure 7:
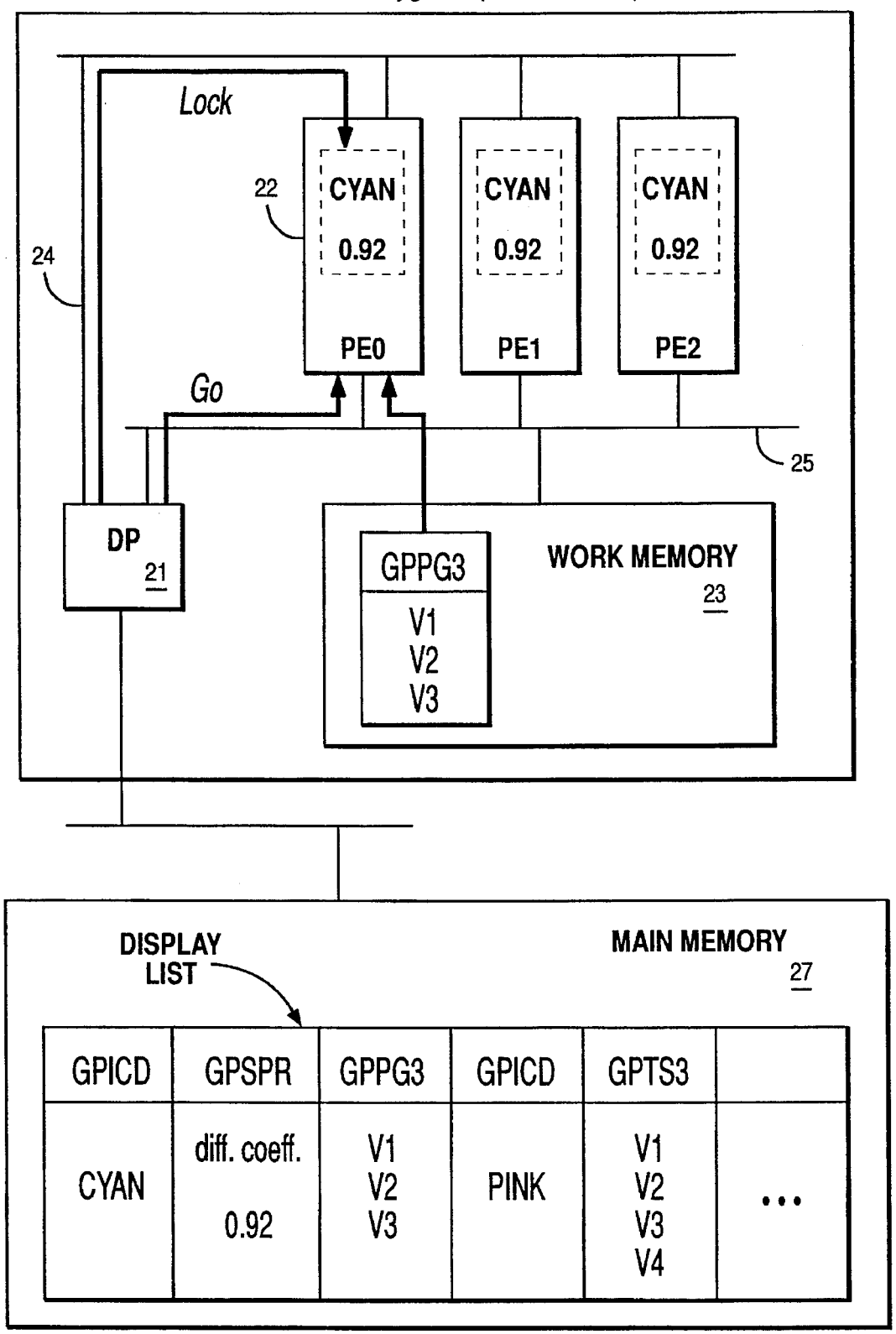
FIG. 7 shows the GO instruction being issued from the dispatch processor.

FIG. 6 shows the status in which next primitives (Polygon 3) have been delivered. The dispatch processor 21 first copies them on the work memory 23. Thereafter, as shown in FIG. 7 it locks the element processor 22 (PE0) via the attribute bus 24, and issues primitive executive instructions (GO). The element processor 22 (PE0), when locked via the attribute bus 24, does not renew the TSL buffer 28 it currently refers to (actually, one of the slave memories 31 and 32 of the TSL buffer 28 currently referred to by itself.)

Figure 8:
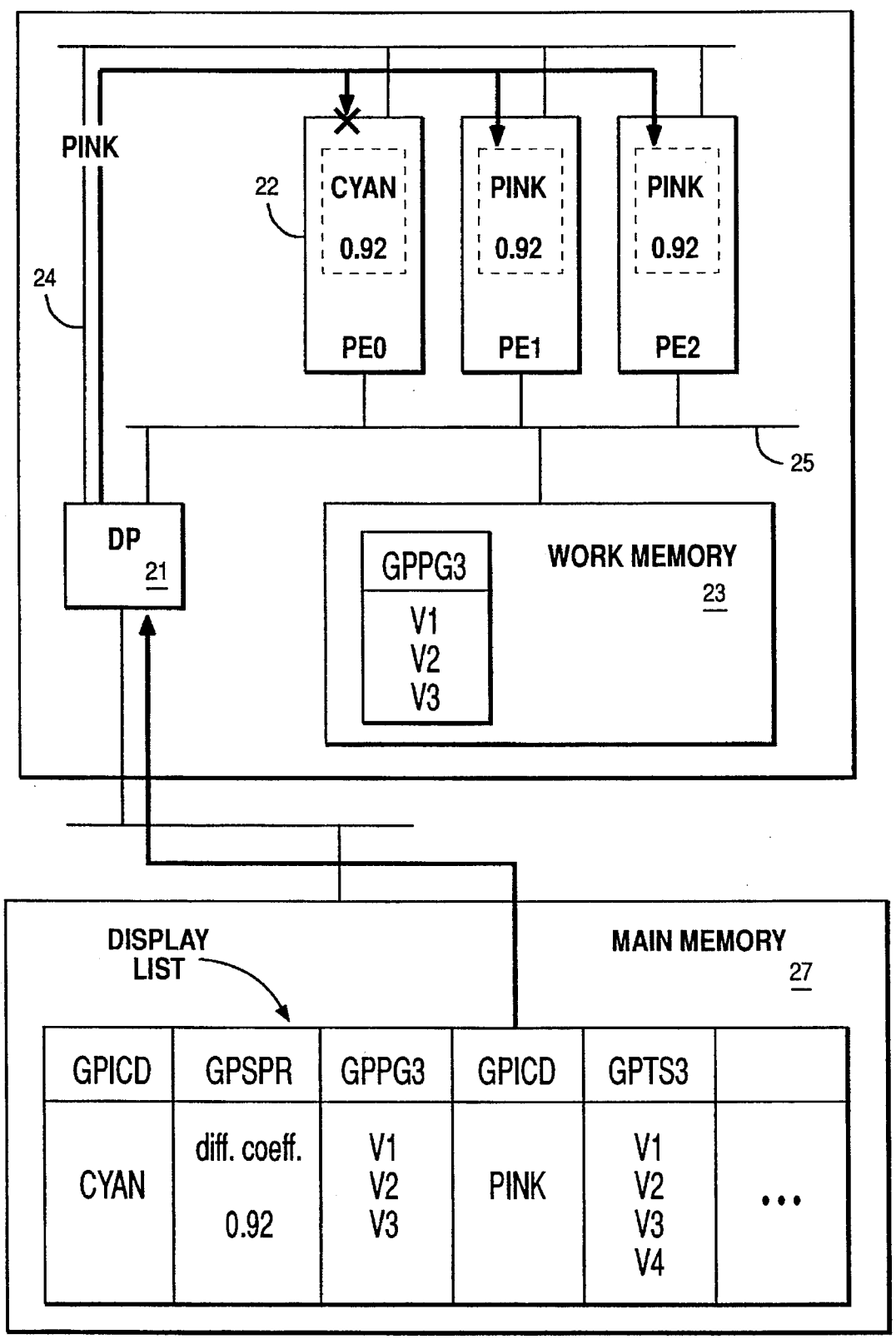
FIG. 8 is the block diagram of FIGS. 4–7 showing the status of the next set of attributes stored in main memory.

FIG. 8 shows the status in which next attribute setting instructions (Set Interior Color Direct PINK) have been delivered. Since the element processor 22 (PE0) is currently locked, it does not take in this attribute. However, the other processors 22 (PE1 and PE2) copy the attributes into their own TSL buffers 28 in the same manner as described above.

Figure 9:
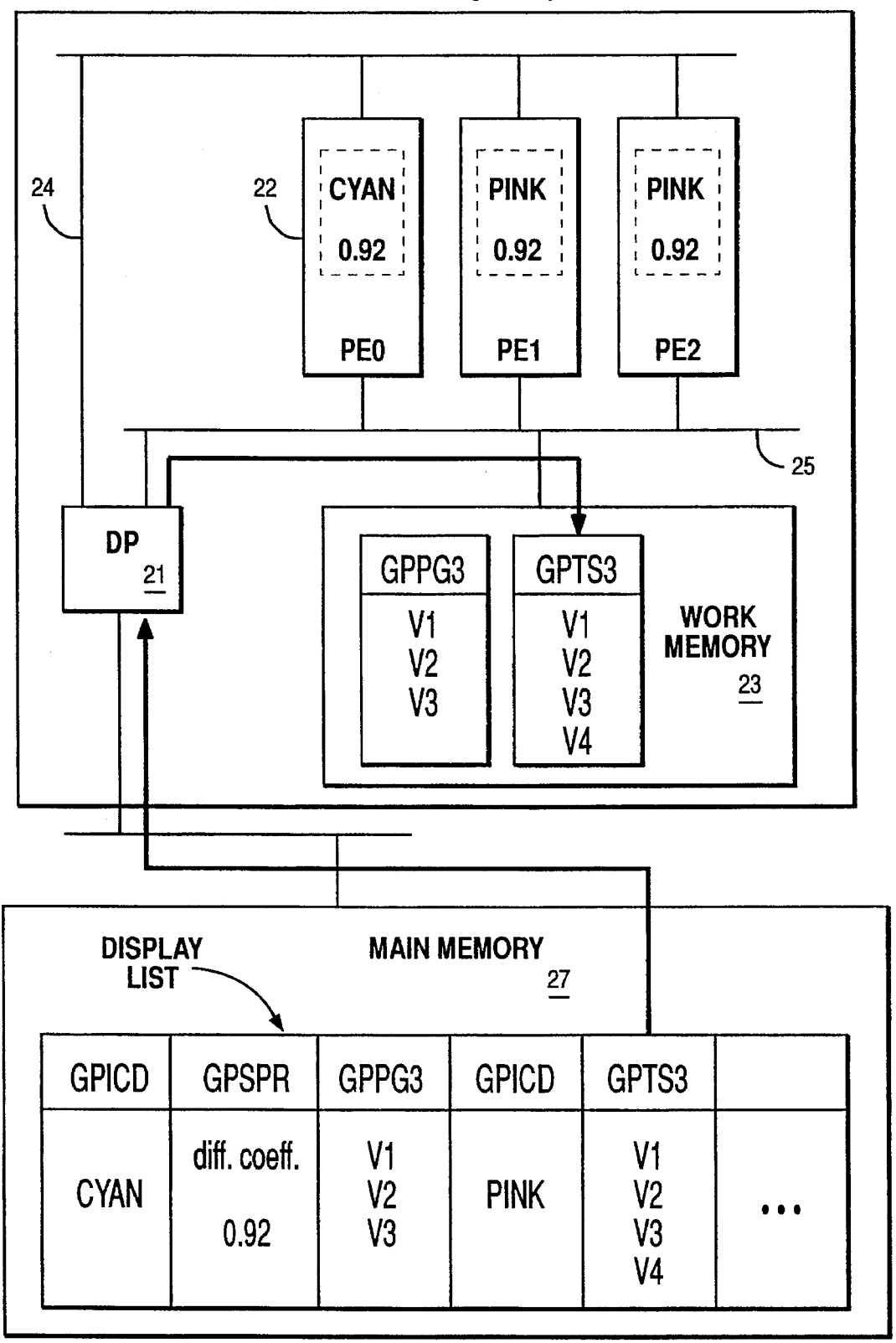
FIG. 9 is the block diagram of FIGS. 4–8 showing the next sequential primitives delivered to the dispatch processor.
Figure 10:
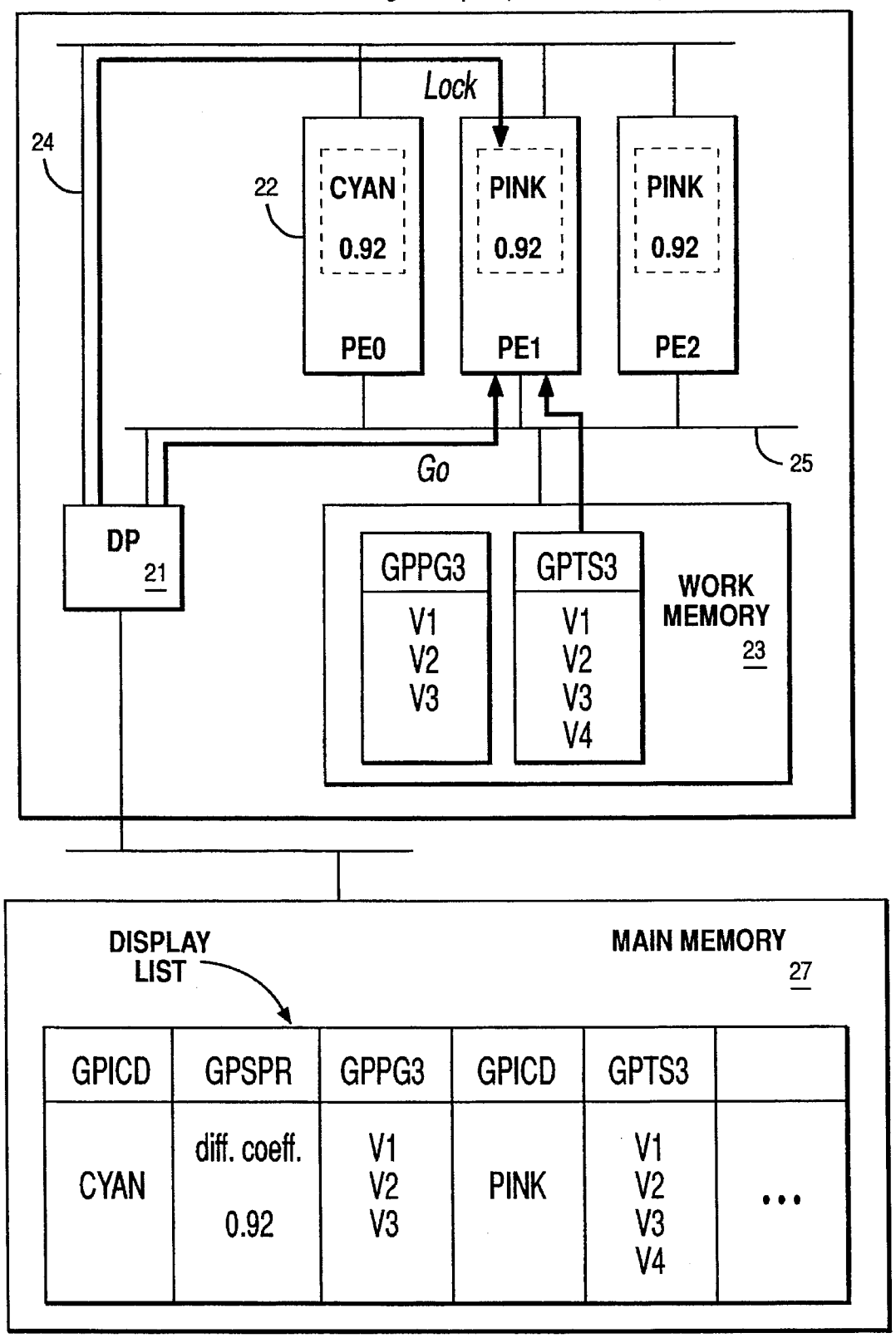
FIG. 10 shows the dispatch processor locking the element processor and issuing primitive instructions.

FIG. 9 shows the status in which next primitives (Triangle Strip 3) have been delivered. The dispatch processor 21 first copies them in the work memory 23. Thereafter, as shown in FIG. 10, the dispatch processor 21 locks the element processor 22 (PE1) via the attribute bus 24, and issues primitive executive instructions (GO). The element processor 22 (PE1), when locked via the attribute bus 24, does not renew the TSL buffer 28 it currently refers to (actually, one of the slave memories 31 and 32 of the TSL buffer 28 currently referred to by itself.)

By performing this process, individual element processors 22 can immediately obtain snap shots of the attributes, and can process the primitives in parallel. However, each element processor 22 must restore the contents of the TSL buffer not renewed during the lock (actually, one of the slave memories 31 and 32 of the TSL buffer 28 currently referred to by itself) so as to coincide with the current contents of TSL.

In order to attain the aforementioned purpose, triple memories that can partly be locked are used as the TSL buffer 28. Its construction has been explained above with reference to FIG. 2. Its operation is explained below with reference to FIG. 11.

Figure 11:
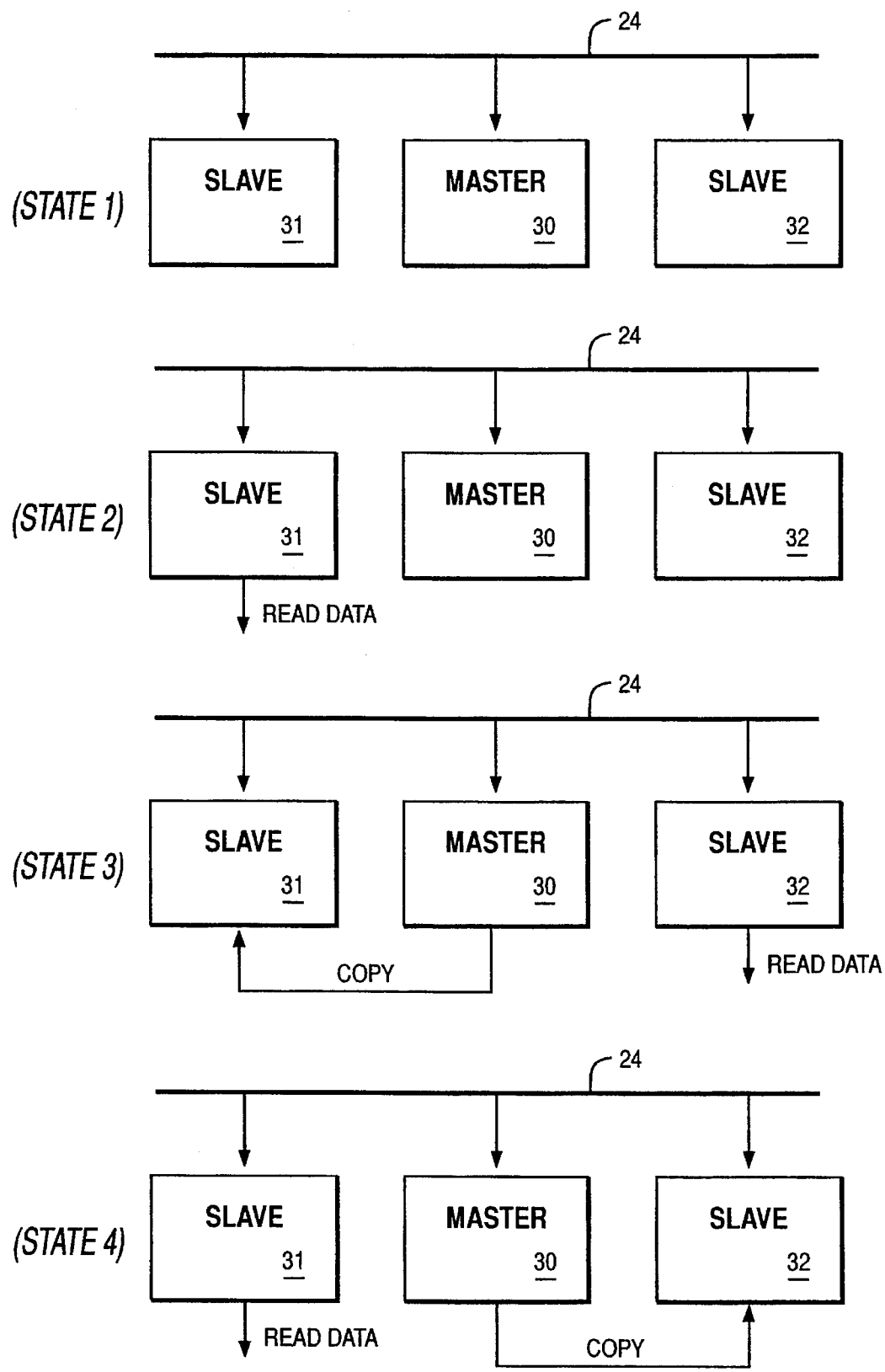
FIG. 11 is a block diagram illustrating the relationship between the master and slave memories of the TSL buffer of FIG. 2.

FIG. 11 schematically shows the construction of the TSL buffer 28 connected to the attribute bus 24.

In the initial status, each of the memories 30, 31 and 32 copy all the attribute values flowing in the attribute bus 24 (State 1 of FIG. 11).

When a lock command is issued from the attribute bus 24 to the element processor 22, the slave memory 31 is first detached from the attribute bus 24 so that renewal of attribute values in the slave memory 31 is not effected thereafter (renewal of the master memory 30 and the slave memory 32 is continued.) Once detachment of the slave memory 31 from the attribute bus 24 is completed, access by the executive unit 29 (see FIG. 2) is accepted. If the executive unit 29 tries to access before completion of the detachment, it is kept waiting until completion of the detachment (State 2 of FIG. 11).

When a lock command to the element processor 22 is again issued from the attribute bus 24, the slave memory 32 then is detached from the attribute bus 24, and the executive unit 29 thereafter cannot access the slave memory 32 (if the executive 29 accesses before completion of the detachment, it is of course kept waiting until completion of the detachment in the same way as described above). Since it seems to the executive unit 29 that both of the slave memories 31 and 32 are the same address (because of the existence of the selectors 35 and 36, the executive unit 29 can never know of the existence of both at the same time), it is not necessary for the executive unit to know which memory (31 or 32) is currently accessible. Concurrently with detachment of the slave memory 32 from the attribute bus 24 (concurrence is not essential provided it is after the detachment), the slave memory 31 is re-connected to the attribute bus 24. However, since the contents of slave memory 31 have not been reflected (updated) by renewal of attribute values since its detachment from the attribute bus 24, all of the contents of the master memory 30 are copied by using DMA 34. Also during this time, if further renewal occurs in attribute values, preference is given to the latest renewal (State 3 of FIG. 11).

When a lock command is issued to the element processor 22 from the attribute bus 24, the slave memory 31 is detached from the attribute bus 24 in the same manner as the foregoing procedure, and memory 32 is put in a condition permitting the executive unit 29 to know it (State 4 of FIG. 11). Thereafter, each element processor 22 alternately uses the slave memories 31 and 32 in the same manner every time when a lock command is issued. The master memory 30 is always maintained in the up-dated state, and the slave memories 31 and 32 can be restored to the updated state by using DMA 34. Since the DMA 34 copying is performed independently of, and in parallel with, execution by the executive unit 29, the executive unit 29 need not normally recognize the execution.

However, in case that the task from the dispatch processor 21 is extremely short so that the task be finished before completion of the DMA operation, the executive unit 29 confirms at the end of the task whether or not the DMA operation has been completed or not. If the DMA operation is not yet completed, the executive unit 29 delays notice regarding completion of the task to the dispatch processor 21 until the DMA operation is completed (the dispatch processor 21 dispatches the next task to the same element processor 22 only after receipt of the notice on completion of the task). Alternatively, it will also be acceptable to prepare means for reporting completion of the DMA operation to the dispatch processor 21 upon completion of the DMA operation. In this case, the dispatch processor 21 dispatches the next task after receiving both the report on completion of the task and the report on completion of the DMA operation.

The DMA operation is actually performed in the interior of a CPU chip by using a specific high-speed bus having a wide bandwidth. Therefore, the time is short (128 CPU cycles if one transfer is possible in 1 CPU cycle, with a memory size of: 2K bytes, and a bus width of 128 bits), and overhead of the copy by the DMA operation is completely hidden so far as a process requiring 128 CPU cycles is being performed.

In this way, each element processor 22 on the multiprocessor system can quickly use snap shots of attributes at arbitrary points of time, and the system can efficiently assign drawing commands to the element processors 22 to execute them in parallel at a high speed.

This invention is not limited to the embodiment referred to above. It involves various modifications without departing the scope, of the present invention. For example, the slave memory may be only one, and the use of the invention is not limited to PHIGS process.

As described above, the invention uses a plurality of memories, such as triple memories, which are provided in the interior of each element processor and can be locked selectively, so that snap shots of a data set at arbitrary points of time can be obtained at a high speed. Therefore, a plurality of instructions responsive to the snap shots at a plurality of arbitrary points of time can be executed in parallel by a plurality of processors.

What is claimed is:

1. A multiprocessor system that utilizes a first data set which is current, and a second data set which is a snapshot of the first data set at a point in time after the first data set has been renewed, to execute instructions corresponding to said first and second data sets in parallel in a plurality of element processors, comprising:

a master memory, a first slave memory and a second slave memory each initially storing said first data set of values;

a bus connecting each of said master memory, said first slave memory and said second slave memory to said plurality of element processors;

means for causing said first slave memory to be in a locked state from said bus such that a renewal of said first data set on said bus is not recorded in said first slave memory, and for maintaining said second slave memory in an unlocked state, wherein said first slave memory stores said second data set and said master memory and said second slave memory each store said first data set;

means for causing said first slave memory to be in an unlocked state to said bus, and for causing said second slave memory to be in a locked state from said bus, wherein said second slave memory stores said second data and said first slave memory and said master memory each concurrently store said first data set;

means for alternately providing said first data set in said master memory to said first slave memory and said second slave memory by alternately copying said first data set to one of said first and second slave memories after said one of said first and second slave memories is placed in said unlocked state, such that said master memory and one of said first and second slave memories each have said first data set stored therein; and execution means for alternately reading at least a part of said second data set from one of said first slave memory and said second slave memory that is in said locked state, and for executing said part of said second data set corresponding to one of said plurality of element processors.

2. The multiprocessor system according to claim 1 wherein said master memory, said first slave memory and said second slave memory each have a dual port structure wherein first ports of said master memory and said first and second slave memories receive said second data set while a second port of either one of said first slave memory and said second slave memory sends at least a part of said second data set to said means for executing.

3. The multiprocessor system according to claim 2 wherein said means for alternately providing transfers said first data set from a second port of said master memory to a second port of one of said first slave memory and said second slave memory when said first or second slave memory is placed in the unlocked state.

4. The multiprocessor system according to claim 3 wherein said means for alternately providing is a direct memory access control unit which directly transfers said first data set from said bus to said master memory.

5. A method for utilizing a first data set which is current, and a second data set which is a snapshot of the first data set at a point in time after the first data set has been renewed, to execute instructions corresponding to said first and second data sets in parallel in a plurality of element processors included in a multiprocessor system, comprising the steps of:

providing a master memory, a first slave memory and a second slave memory each initially storing said first data set of values;

providing a bus which connects each of said master memory, said first slave memory and said second slave memory to said plurality of element processors;

selectively causing said first slave memory to be in a locked state from said bus such that a renewal of said first data set on said bus is not recorded in said first slave memory, and maintaining said second slave memory in an unlocked state, wherein said first slave memory stores said second data set and said master memory and said second slave memory each store said first data set;

causing said first slave memory to be in an unlocked state to said bus, and causing said second slave memory to be in a locked state from said bus, wherein said second slave memory stores said second data set and said first slave memory and said master memory each concurrently store said first data set;

alternately providing said first data set in said master memory to said first slave memory and said second slave memory, by alternately copying said first data set to one of said first and second slave memories after said one of said first and second slave memories is placed in said unlocked state, such that said master memory and one of said first and second slave memories each have said first data set stored therein; and alternately reading at least a part of said second data set from one of said first slave memory and said second slave memory that is in said locked state, and executing said part of said second data set corresponding to one of said plurality of element processors.

* * * * *